Patented Jan. 4, 1938

2,104,619

UNITED STATES PATENT OFFICE 2,104,619

NONCAKING SMOKED SALT AND METHOD OF MAKING THE SAME

Rudolf Lehmann, Philadelphia, Pa., assignor to Pennsylvania Salt Manufacturing Company, Philadelphia, Pa., a corporation of Pennsylvania No Drawing. Application July 2, 1936, Serial No. 88,686

4 Claims. (Cl. 99—143)

My invention relates to a novel and improved smoked salt characterized by its non-caking qualities, and to the method of producing said smoked salt. This application is filed as a continuation in part of my copending application Serial No. 55,125, filed December 18, 1935.

The principal object of the invention is to provide a free-flowing smoked salt which can be stored and used as desired without encountering solidification of the crystal mass or the caking thereof.

A further object is to provide a smoked salt product to which has been added a very small amount of a non-toxic material which is non-reactant with the inorganic ingredients of the salt, and compatible with the organic components, the presence of the material maintaining the smoked salt in a free-flowing condition.

Other objects, including the provision of a method of manufacturing the novel product, will be apparent from a consideration of the specification and claims.

Smoked salt is a well-known article of commerce, and is generally prepared by the absorption of the constituents of smoke, preferably that of the hickory sawdust, by crystalline sodium chloride. Usually, the salt and the smoke are passed together thru a tube to which is connected an electrical device causing the precipitation of the constituents of the smoke on the salt and the walls of the tube. Thorough mixing of the two types of material is provided and the salt is allowed to scrape the walls of the tube so that the smoke constituents precipitated thereon will also become part of the final mixture. The smoked salt is employed widely in the curing of meats and the like, and in certain grades, known as sugar cure salt, sugar, sodium nitrate, and if desired other ingredients, are added to the smoked salt to furnish particular curing properties to the salt.

Smoked salt is a two phase organic-inorganic system in which a film of the organic compounds obtained from wood smoke is associated with the inorganic sodium chloride crystals. The hydration of the organic material of the freshly made smoked salt is at the optimum where the most desirable physical properties of the film are encountered, the hydration being sufficient to maintain the product in a free-flowing condition. If the hydration of the organic phase is lowered to any appreciable extent, the organic material hardens and cements the crystals of sodium chloride together, forming a solidified mass. The manufacturers of smoked salt have endeavored to overcome the caking difficulties by improvements in the type, size, and air-tightness of the containers in which the smoked salt is packed. However, the use of the most improved package does not obviate the caking and the objectionable decrease of hydration of the organic film takes place during storage of the product even if it is carefully packed in such containers.

A caking action of a different type is encountered with table salt, due to the presence in the salt of small quantities of calcium and magnesium chlorides. A number of methods have been in use for many years for keeping this salt dry and for preventing caking thereof. One of the most widely used processes involves the addition of a small percentage of sodium phosphate or of sodium carbonate to the salt. The materials convert the deliquescent salts into other salts of a non-deliquescent nature. Tricalcium phosphate has also been used, and this compound prevents the caking of the salt by forming a coating of a non-hygroscopic material over the hygroscopic salt grain so that the particles are kept apart. None of these methods functions satisfactorily with smoked salt due to the different cause of the caking of the product.

The present invention departs from the known methods of preventing caking, and contemplates the addition to the smoked salt of a deliquescent or hygroscopic substance which maintains the hydration of the organic film at a point where hardening thereof and consequent caking of the product is avoided. The product of the present invention can be packed in less expensive containers than at present employed, with assurance that the free-flowing quality of the product will be retained until it is used in the curing of meat.

The deliquescent materials added are preferably calcium chloride, or magnesium chloride. The calcium and magnesium chlorides are included herein in the term "a substantially non-toxic, deliquescent, alkaline earth chloride".

The amount of deliquescent substance added is relatively small, 1% of the substance on an anhydrous basis being usually sufficient to maintain the desired hydration. The incorporation of larger amounts, even up to 4% to 5%, or higher, may be used, but the presence of a large excess is not recommended since the presence of unnecessary quantities may inhibit the curing operation to some extent, and in any event the ingredient cost is raised thereby. Less than 1% may be added with distinct improvement in the physical behavior of the compounded material. For example, .5% and less have been added and found to function advantageously. For practical purposes, however, the optimum addition is in the neighborhood of 1% on the basis of the anhydrous compound.

The deliquescent substance added may be incorporated with smoked salt in any desired manner and at any stage of the process, so long as care is taken to insure thorough dissemination of the substance in the smoked salt. In the preferred process the deliquescent substance is incorporated with the product after the sodium chloride crystals have been associated with the constituents of the smoke. If the anti-caking agent is solid and is added in this condition, the particle size for the most rapid mixing and the optimum efficiency should be substantially the same size as, or smaller than, the smoked salt crystals. While larger size particles may be employed, a more uniform distribution and a product of more pleasing appearance results when the material added is relatively fine. A uniform mixture may be obtained by adding the agent during the agitation of the smoked salt in a mechanical mixer. The deliquescent material may be applied by agitating a solution thereof with the smoked salt, but more advantageously by atomizing or spraying the solution over the surfaces of the salt crystals. If desired, the agent may be associated with the sodium chloride crystals before the smoking operation by methods comparable to those recited for the treatment of the smoked salt. A solution of the deliquescent agent may be added to the salt solution from which the sodium chloride is to be crystallized.

Considerable modification is possible in the proportions of the deliquescent substance employed, and in the methods used for its incorporation with the smoked salt, without departing from the essential features of my invention.

I claim:

1. A smoked salt characterized by its non-caking qualities due to the incorporation therewith of a relatively small amount of a substantially non-toxic, deliquescent alkaline earth chloride, in addition to the deliquescent materials normally present in smoked salt.

2. The method of making a smoked salt of free-flowing and non-caking properties which comprises mixing with smoked salt a relatively small amount of a substantially non-toxic, deliquescent alkaline earth chloride, in addition to the deliquescent materials normally present in smoked salt.

3. The smoked salt of claim 1 in which the substantially non-toxic, deliquescent alkaline earth chloride is present in amounts of about 1%.

4. The method of claim 2 in which the substantially non-toxic, deliquescent alkaline earth chloride is added in amounts of about 1%.

RUDOLF LEHMANN.